Nov. 24, 1931.    G. OPITZ    1,833,433
CHECK BOOK
Filed Aug. 11, 1928
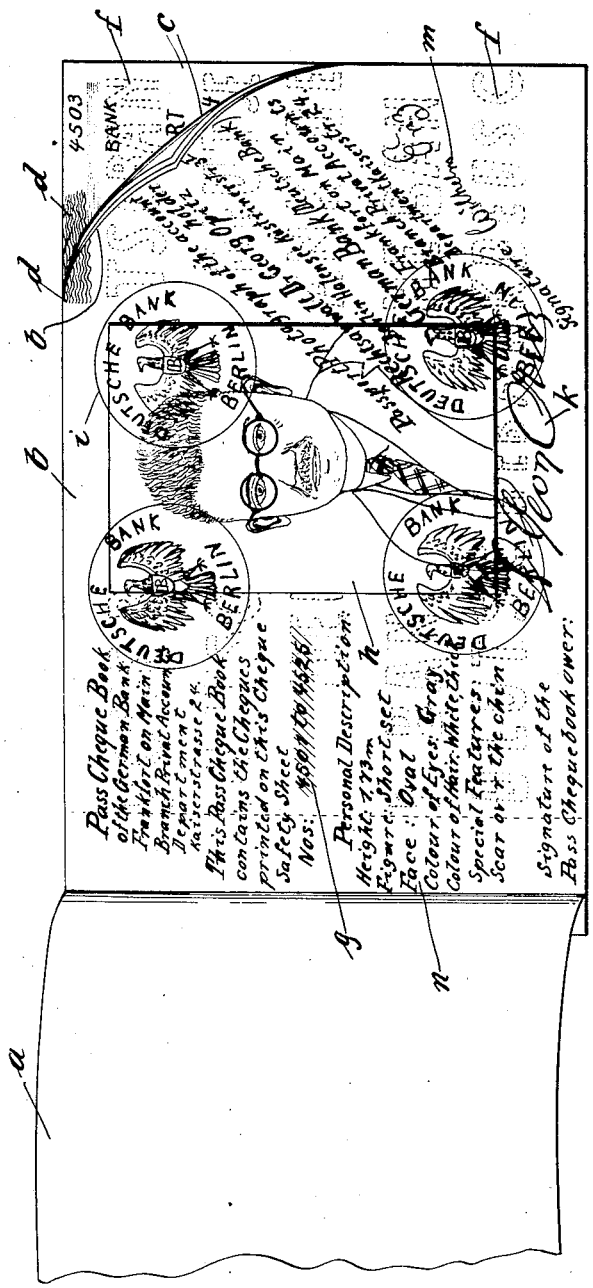
INVENTOR
Georg Opitz
by Lanyon, Pany, Ceard & Lanyon
Att'ys.

Patented Nov. 24, 1931

1,833,433

UNITED STATES PATENT OFFICE

GEORG OPITZ, OF BERLIN, GERMANY

CHECK-BOOK

Application filed August 11, 1928, Serial No. 299,036, and in Germany August 16, 1927.

Checks, bills, savings bank books and similar documents relating to the payment of money by banks, all of which are hereinafter referred to as "checks", are, in addition to the technical character of check paper and check printing, protected against forgery, falsification and other misuses by the individual documents being issued in covers or books having serial numbers, means for comparing the signature of the payor or the payee being provided as evidence. In deposit business for example, the signature of the payor is compared with the specimen signature deposited by the account holder with the bank. In the so-called travellers' check business for example, the checks drawn from bank to bank are provided with a specimen signature of the payee and the person presenting the check has then to repeat his signature prior to the check being accepted, so that the paying bank is in a position to compare the signature given with the specimen signature on the check.

Experience has shown that it is frequently possible for illegal possessors of check books or individual printed checks, stolen, lost or otherwise alienated from the lawful owner, to obtain payment on such checks. In deposit business this is for example possible, owing to the fact that the unlawful possessor of a printed check fraudulently uses the actual existence of a genuine banking account and thus obtains the acceptance of the check in place of payment, and in travellers' check business for example by the unlawful possessor forging the specimen signature of the payee or the lawful owner. In the first case the receiver of the check or the real account holder may suffer the loss and in the second case the paying or drawing bank, as the case may be. Even passports provided with photographs which are requested as evidence, are not always a protection against loss, as professional criminals in particular are not infrequently provided with forged passports. Attempts have already been made to eliminate these drawbacks, by providing the check book itself or the like with auxiliary safety means for testing the identity of the lawful owner and the correct numbers of the printed checks. For this purpose, on the cover of the book or on an ordinary piece of paper bound therewith safety particulars in the form of the personal description of the lawful owner are provided. The safeguard thus obtained, however, is only slight as alterations by means of mechanical or chemical erasion or inter-changing the safety sheet are too easily effected.

The invention provides a remedy owing to the fact that to the check book a special sheet is added, possessing the same or corresponding printing-technical or paper-technical or the like safety means as the printed check itself, on which sheet the proofs of identity are provided, particularly a passport photograph and specimen signature of the client, and the serial number. The passport photograph is fixed for example to the check safeguarding-sheet in the same manner as with ordinary passports issued by the authorities. In this connection gum, tubular rivets or a like means can be used, whereby safeguards such as bank stamps can be employed which partly cover the photograph and partly the surrounding surface.

By means of the connection described of photographs certified by the bank and clients' signatures with the printed checks technically safeguarded by safety paper and safety printing, the misuse referred to of printed checks is prevented or at least rendered exceedingly difficult, and consequently an additional safeguard for the bank and its clients is obtained. The production of travellers' passports, which frequently leads to difficulties, is thus rendered superfluous. By means of this technical arrangement the circulation of checks gains considerably in safety and consequently in economic importance.

It will be understood that the place intended for fixing the passport photograph can also be rendered sensitive to light and the passport photograph copied directly thereon.

In the accompanying drawing a check book according to the invention is shown diagrammatically by way of example.

The cover of the check book, which may be of any desired kind is shown at $a$. To the latter is connected the safety sheet $b$ which, as stated above, consists of safety paper, preferably of the same paper as the check c. In order to indicate this, the same wavy line device d is shown on sheets b and c, but only at one single point, so as not to render the drawing obscure.

It is also shown that sheet b, like the sheets c, is also provided with water marks, f, which are only shown in faint dotted lines. According to the drawing these water marks consist of the words "Deutsche Bank."

The check book contains checks Nos. 4501–4525. The first two checks (together with the safety sheet are shown slightly bent over in the upper right hand corner, in order that the number "4503" of the third check can be seen. At g on the safety sheet are shown the numbers "4501–4525."

To the safety sheet b is attached the photograph h of the lawful owner, or, as it is termed, the "favoured person" (payee), further protected by the imposed stamps i which partially cover the edge of the photograph.

Under the photograph is the signature k of the lawful owner.

In like manner the signature of the bank is provided on the safety sheet at m.

Finally the safety sheet contains at n the personal description of the authorized owner.

The above by no means exhausts the number of safeguards; on the contrary manifold other safety means are possible. Of particular importance in this respect are the finger prints of the authorized owner.

It will be understood that the safety sheet may also constitute the cover or may be connected therewith, in so far as it only consists of safety paper and corresponds to the above mentioned conditions.

What I claim is:—

1. A check book comprising a plurality of check forms and an identification sheet bound together and formed of the same safety paper, unique to the issuing bank, the check forms being numbered in sequence, and the identification sheet containing a synopsis of the numbers of the several checks in the book, an identification or comparison signature, a passport picture, and business insignia, and means on the said passport picture and said identification sheet for preventing alteration of the picture and the business insignia of the business possesor.

2. A book of checks consisting of numbered impressions on safety paper bound together with at least one safety sheet consisting of the same kind of safety paper as the checks, the safety sheet including a photograph of the authorized owner and an indication of the serial number of the checks.

3. A book of checks consisting of numbered impressions on safety paper bound together with at least one safety sheet consisting of the same kind of safety paper as the checks, the safety sheet including a photograph of the authorized owner and his signature.

4. A book of checks consisting of numbered impressions on safety paper bound together with at least one safety sheet consisting of the same kind of safety paper as the checks, the safety paper having means rendering it unique to the issuing bank.

In testimony whereof I affix my signature.

GEORG OPITZ.